Figure 1:
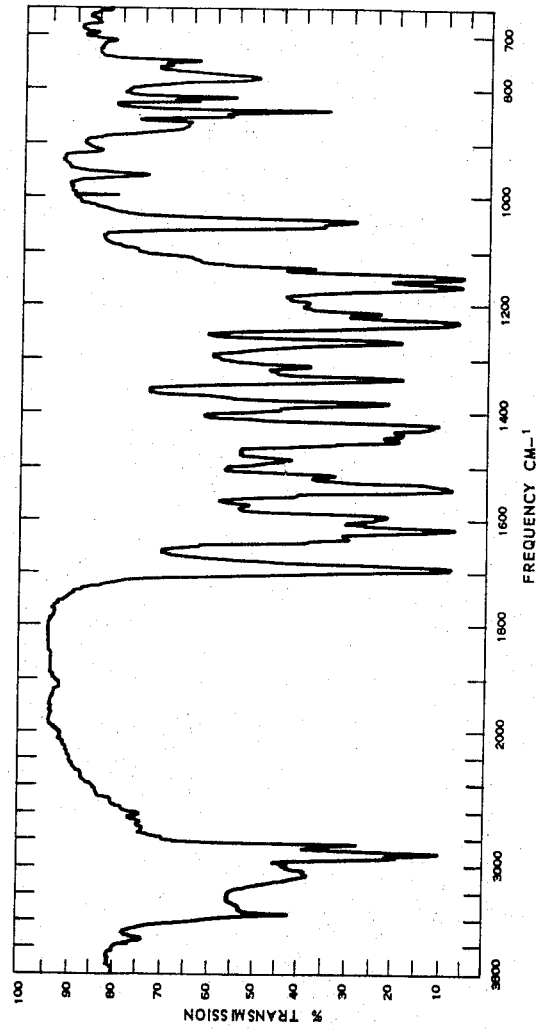

Dec. 19, 1967  M. E. BERGY ETAL  3,359,165
ANTIBIOTIC LOMONDOMYCIN AND METHOD OF PRODUCTION
Filed Nov. 2, 1966  2 Sheets-Sheet 2

MALCOLM E. BERGY
LEROY E. JOHNSON
INVENTORS

ATTORNEYS

United States Patent Office 3,359,165
Patented Dec. 19, 1967

3,359,165
ANTIBIOTIC LOMONDOMYCIN AND METHOD
OF PRODUCTION
Malcolm E. Bergy and Le Roy E. Johnson, both of Kalamazoo, Mich., assignors to The Upjohn Company, Kalamazoo, Mich., a corporation of Delaware
Filed Nov. 2, 1966, Ser. No. 591,632
9 Claims. (Cl. 167—65)

This invention relates to a novel composition of matter and to a process for the production thereof. More particularly, this invention relates to a new compound, lomondomycin (U–24,792), and to a process for the production thereof.

Lomondomycin is a chemical compound which is producible by culturing a lomondomycin-producing actinomycete in an aqueous nutrient medium. It is an acidic compound which has the property of adversely affecting the growth of Gram-positive and Gram-negative bacteria, for example, *Staphylococcus aureus*, *Bacillus subtilis*, *Streptococcus hemolyticus*, *Streptococcus faecalis*, *Diplococcus pneumoniae*, *Escherichia coli*, *Proteus vulgaris*, *Klebsiella pneumoniae*, *Salmonella schottmuelleri*, and *Pseudomonas aeruginosa*. Lomondomycin also has antifungal activity against various fungi, for example, *Nocardi asteroides*, *Blastomyces dermatitidis*, *Coccidioides immitis*, *Geotrichum* sp., *Hormodendrum compactum*, *Cryptococcus neoformans*, *Histoplasma capsulatum*, *Sporotrichum schenckii*, *Monosporum apiospermum*, *Trichophyton rubrum*, *Microsporum canis*, *Trichophyton interdigitale*, *Candida albicans*, *Trichophyton violaceum*, *Trichophyton asteroides*, and *Trichophyton mentagrophytes*. Accordingly, lomondomycin can be used alone or in combination with other antibiotic agents to prevent the growth of or reduce the number of bacteria and fungi, as disclosed above, in various environments. For example, it is useful for controlling the infection of silkworms caused by pathogenic cultures of *Bacillus subtilis*; it is also useful as an oil preservative, for example, as a bacteriostatic agent to inhibit the growth of certain microorganisms that cause spoilage in cutting oils. Lomondomycin is also useful as an antifungal agent in industrial preservatives, for example, as an antifungal rinse for laundered clothes and for impregnating papers and fabrics; and it is useful for suppressing the fungal growth of sensitive organisms in plate assays and other biological media. Lomondomycin also can be used as a feed supplement to promote the growth of animals, for example, mammals, birds, fish and reptiles.

*Chemical and physical properties of lomondomycin*

Crystalline lomondomycin has the following chemical and physical properties:

Color: Olive-yellow.
Elemental analyses: C, 56.89; H, 3.35; N, 8.90; O, 30.28.
Empirical formula: $C_{15}H_{10}N_2O_6$.
Molecular weight: 314 (mass spectrometer).
Melting point: >320° C., decomposition.

Solubilities: Less than 1 mg./ml. in water, methanol, cyclohexane, acetone, ether, and ethyl acetate. Very soluble in acetone and methyl ethyl ketone at a pH of about 2.0. Greater than 10 mg./ml. in water at pH 10–12. Greater than 25 mg./ml. in dimethylformamide.

Ultraviolet absorption spectrum:

Methanol:
Max. at 219 mu, $a=80.61$
sh. at 260 mu, $a=84.48$
Max. at 284 mu, $a=112.23$
Max. at 316 mu, $a=41.87$
sh. at 330 mu, $a=39.96$
Max. at 372 mu, $a=28.32$
Max. at 441 mu, $a=14.51$
sh. at 463 mu, $a=13.34$ .01 N HCl in methanol:
Max. at 221 mu, $a=87.58$
Max. at 270 mu, $a=160.47$
Max. at 311 mu, $a=43.36$
Max. at 375 mu, $a=29.95$
sh. at 439 mu, $a=15.14$
sh. at 465 mu, $a=12.75$ .01 N sodium hydroxide:
Max. at 239 mu, $a=62.16$
Max. at 265 mu, $a=111.01$
Max. at 299 mu, $a=90.01$
Max. at 342 mu, $a=111.29$
sh. at 390 mu, $a=26.73$
Max. at 478 mu, $a=15.08$ Infrared spectrum: The infrared absorption spectrum of lomondomycin suspended in mineral oil mull is reproduced in FIGURE 1 of the drawing. Lomondomycin shows bands at the following wave-lengths expressed in reciprocal centimeters:

3550 (W), 3370 (M), 3315 (M), 3075 (M), 2990 (M), 2945 (S) (oil), 2920 (S) (oil), 2850 (S) (oil), 2680 (W), 2620 (W), 1720 (W), 1702 (S), 1097 (S), 1655 (W), 1643 (S), 1625 (S), 1600 (S), 1577 (M), 1560 (M), 1547 (S), 1523 (S), 1492 (M), 1458 (S) (oil), 1446 (S), 1436 (S), 1430 (S), 1401 (M), 1390 (S), 1344 (S), 1320 (M), 1275 (S), 1238 (S), 1223 (S), 1201 (M), 1170 (S), 1153 (S), 1136 (M), 1120 (W), 1100 (W), 1059 (S), 1049 (S), 962 (W), 917 (W), 875 (W), 865 (W), 954 (M), 845 (M), 826 (W), 820 (M), 783 (M), 760 (W), 749 (W), 710 (W).

Lomondomycin shows bands at the following wave-lengths expressed in reciprocal centimeters when pressed in a KBr disc:

3370 (M), 3075 (M), 2945 (M), 2660 (W), 2610 (W), 1720 (W), 1702 (S), 1697 (S), 1655 (M), 1649 (M), 1643 (S), 1626 (S), 1600 (S), 1580 (M), 1562 (M), 1546 (S), 1524 (S), 1494 (M), 1460 (M), 1446 (S), 1433 (S), 1401 (M), 1390 (S), 1344 (S), 1320 (M), 1275 (S), 1238 (S), 1223 (S), 1170 (S), 1154 (S), 1136 (M), 1120 (M), 1056 (S), 1048 (S), 962 (W), 917 (W), 875 (W), 854 (M), 845 (M), 826 (W), 820 (M), 788 (M), 750 (W), 710 (W).

Band intensities are indicated as S, M, and W, respectively, and are approximated in terms of the backgrounds in the vicinity of the band. An S band is of the same order of intensity as the strongest in the spectrum; M bands are between one-third and two-thirds as intense as the strongest band; and W bands are less than one-third as intense as the strongest band. These estimates are made on the basis of a percent transmission scale.

Figure 2:
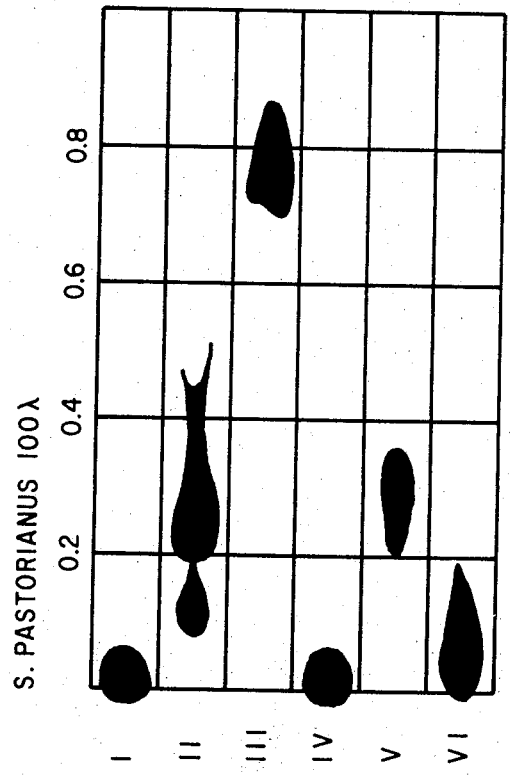

Lomondomycin has a characteristic papergram pattern as shown in FIGURE 2 of the drawings when using the following solvent systems:

(I) 1-butanol, water (84:16), 16 hours.
(II) 1-butanol, water (84:16), plus 0.25% p-toluenesulfonic acid, 16 hours.
(III) 1-butanol, acetic acid, water (2:1:1), 16 hours.
(IV) 2% piperidine (v./v.) in 1-butanol, water (84:16), 16 hours.
(V) 1-butanol, water (4:96), 5 hours.
(VI) 1-butanol, water (4:96), plus 0.25% p-toluene-sulfonic acid, 5 hours.

The microorganism

The actinomycete used according to this invention for the production of lomondomycin is *Streptomyces lomondensis* var. *lomondensis*. One of its strain characteristics is the production of lomondomycin. A subculture of the living organism can be obtained from the permanent collection of the Northern Utilization and Research Division, Agricultural Research Service, U.S. Department of Agriculture, Peoria, Ill., U.S.A. Its accession number in this repository is NRRL 3252.

The characteristics of *Streptomyces lomondensis* var. *lomondensis*, NRRL 3252, are given in the following tables:

TABLE I.—APPEARANCE OF *S. LOMONDENSIS* v. *LOMONDENSIS* ON EKTACHROME*

| Agar Medium | Surface | Reverse |
|---|---|---|
| Bennett's | Blue-gray | Brown. |
| Czapek's Sucrose | Blue-peach | Orange. |
| Maltose-Tryptone | Blue-pink | Brown. |
| Peptone-Iron | No aerial growth | Do. |
| 0.1% Tyrosine | Blue | Tan-brown. |
| Casein Starch | do | Do. |

*Dietz, A. 1954. Ektachrome Transparencies as Aids in Actinomycete Classification. Ann. N.Y. Acad. Sci., 60:152-154.

TABLE II.—MICROSCOPIC CHARACTERISTICS OF *S. LOMONDENSIS* v. *LOMONDENSIS*

Light microscope _____ Sporophores short, straight to open spiral to spiral.

Electron microscope:
    Direct examination ____ Spores warty to spiny.
    Carbon replication ____ Spores warty to spiny. Poor differentiation of spores.

TABLE III.—GROWTH *S. LOMONDENSIS* v. *LOMONDENSIS* ON CARBON COMPOUNDS IN SYNTHETIC MEDIUM
[J. Bact. 56: 107–114, 1948]

| | |
|---|---|
| Control | — |
| 1. D-xylose | + |
| 2. L-arabinose | + |
| 3. Rhamnose | + |
| 4. D-fructose | + |
| 5. D-galactose | + |
| 6. D-glucose | + |
| 7. D-mannose | + |
| 8. Maltose | + |
| 9. Sucrose | + |
| 10. Lactose | + |
| 11. Cellobiose | + |
| 12. Raffinose | + |
| 13. Dextrin | + |
| 14. Inulin | + |
| 15. Soluble starch | + |
| 16. Glycerol | + |
| 17. Dulcitol | (−) |
| 18. D-mannitol | + |
| 19. D-sorbitol | (−) |
| 20. Inositol | + |
| 21. Salicin | — |
| 22. Phenol | — |
| 23. Cresol | — |
| 24. Na formate | — |
| 25. Na oxalate | — |
| 26. Na tartrate | — |
| 27. Na salicylate | — |
| 28. Na acetate | + |
| 29. Na citrate | + |
| 30. Na succinate | + |

+=Good growth.
(+)=Moderate growth.
(−)=Poor growth.
—=No growth.

TABLE IV.—CULTURAL AND PHYSIOLOGICAL CHARACTERISTICS OF *S. LOMONDENSIS* v. *LOMONDENSIS*

| Agar Medium | Surface | Reverse | Other |
|---|---|---|---|
| Peptone-Iron | Trace gray | Brown | Brown pigment. Melanin +. |
| Calcium Malate | Gray-green | Yellow-green | No pigment. Malate solubilized. |
| Glucose Asparagine | Peach | Orange | Orange-tan pigment. |
| Skim-Milk | Gray-white | Tan-brown | Tan pigment. Casein not solubilized. |
| Tyrosine | Gray-blue | Brown | Tan-brown pigment. Tyrosine solubilized. |
| Xanthine | Gray-green | Green | Pale yellow-tan pigment. Xanthine solubilized. |
| Nutrient Starch | Blue-gray | Pale olive yellow | Yellow pigment. Starch hydrolyzed. |
| Yeast Extract-Malt Extract | Gray-orange | Orange | Orange-tan pigment. |
| Bennett's | Blue-gray-peach | Orange-tan | Do. |
| Czapek's Sucrose | Pale blue-gray | Peach-green | Pale peach pigment. |
| Maltose-Tryptone | Peach-blue | Orange-tan | Orange-tan pigment. |
| Gelatin Medium: | | | |
|   Plain | | | Brown pigment. ½ liquefied. |
|   Nutrient | | | Do. |
| Broth Medium: | | | |
|   Nutrient Nitrate | Blue-gray on surface ring | Trace colorless vegetative growth at base | Yellow-tan pigment. Nitrate reduced to nitrite. |
|   Synthetic Nitrate | | Trace pink-tan vegetative growth throughout | Orange pigment. Nitrate reduced to nitrite. |
| Litmus Milk | White on brown surface ring | | No peptonization. No coagulation. pH 6.7. |

TABLE V.—REFERENCE COLOR CHARACTERISTICS OF *S. LOMONDENSIS* v. *LOMONDENSIS*

| Medium | Color Harmony Manual 3rd Edition, 1948 | ISCC–NBS Method of Designating Colors and A Dictionary of Color Names, Circular 553, 1955. |
|---|---|---|
| Bennett's Agar: | | |
|   Surface | 3ca(g) pearl pink, shell to 15cb(g) cloud blue | 73gm pale yellow orange, 184m very pale blue, 189gm bluish white. |
|   Reverse | 5ng(g) brick red, henna to 5pg(g) henna, light copper brown, russet, rust brown. | 43n moderate reddish brown, 55g strong brown, 55gm strong brown. |
|   Pigment | 5pg(g) henna, light copper, brown, russet, rust brown. | 55gm strong brown. |
| Czapek's Sucrose Agar: | | |
|   Surface | 15ba(g) blue tint | 184m very pale blue, 189gm bluish white. |
|   Reverse | 2fb(g) bamboo, buff, straw, wheat | 87g moderate yellow, 89m pale yellow. |
|   Pigment | Trace 4ca(g) flesh pink, shell pink, tearose | 28g light yellowish pink, 31gm pale yellowish pink. |
| Maltose Tryptone Agar: | | |
|   Surface | 15ba(m) blue tint | 184m very pale blue, 189gm bluish white. |
|   Reverse | 3ni(g) clove brown | 77m moderate yellowish brown, 95g moderate olive-brown. |
|   Pigment | Pale 3ni(g) clove brown | Do. |

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, corn starch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distiller's solubles, animal peptone liquors, meat and bone scraps and the like. Combination of these carbon and nitrogen sources can be used advantageously. Trace metals, for example, zinc, magnesium, manganese, cobalt, iron, and the like need not be added to the fermentation media since tap water and unpurified ingredients are used as media components.

Production of the compound of the invention can be effected at any temperature conductive to satisfactory growth of the microorganism, for example, between about 18° and 40° C. and preferably between about 20° and 32° C. Ordinarily, optimum production of the compound is obtained in about 2 to 10 days. The medium normally stays fairly close to neutral during the fermentation. The final pH is dependent, in part, on the buffers present, if any, and in part on the initial pH of the culture medium which is advantageously adjusted to about pH 7.2 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is an acidic chemical compound having the formula $C_{15}H_{10}N_2O_6$. It is soluble at less than 1 mg./ml. in water, and methanol, butanol, and like lower alkanols; acetone, methyl ethyl ketone, isopropyl butyl ketone, and like alkanones; ethyl acetate, amyl acetate, butyl acetate, and like aliphatic esters; ether, and cyclohexane. It is soluble at greater than 10 mg./ml. in water at a pH of 10–12. Lomondomycin is soluble at greater than 25 mg./ml. in dimethylformamide and it is very soluble in acetone and methyl ethyl ketone at a pH of about 2.0.

A variety of procedures can be employed in the isolation and purification of lomondomycin, for example, solvent extraction, silica gel chromatography, liquid-liquid distribution in a Craig apparatus, and crystallization from solvents. Solvent extraction procedures are preferred for commercial recovery, inasmuch as they are less time consuming and less expensive. Crystallization from dimethylformamide is a preferred purification procedure.

In a preferred recovery process, lomondomycin is recovered from its culture medium by separation of the mycelial and undissolved solids by conventional means such as by filtration or centrifugation. The antibiotic is then removed from the filtered or centrifuged broth by extraction. For the extraction of lomondomycin from the filtered broth, water-immiscible solvents in which it is soluble at a pH of about 2.0, for example, methyl ethyl ketone, isopropyl butyl ketone, and like lower alkanones, can be used. Methyl ethyl ketone is the preferred extraction solvent. The extract obtained by methyl ethyl ketone extraction can be concentrated in vacuo. Crystalline lomondomycin can be obtained from this concentrate by the addition of a lower alkanone, acetone is preferred, and then concentrating the mixture in vacuo until crystallization starts. The crystalline lomondomycin can be removed by filtration, washed with water and dried in vacuo to a constant weight. This preparation can be used in environments where higher purity of the antibiotic is not necesary.

Alternatively, lomondomycin can be recovered from the culture medium by adjusting the fermentation filtrate to about pH 4.5 with sulfuric acid and then cooling to about 40° F. to induce precipitation. The precipitate is removed by filtration using a small amount of diatomaceous earth as filter aid. Lomondomycin is present in the precipitate. The precipitate is dissolved in water and ammonium hydroxide at a pH of about 9.2 and the solution filtered. The aqueous solution is then freeze-dried to provide a crude preparation of lomondomycin which can be used in environments where higher purity of the antibiotic is not necessary.

As a further alternative, lomondomycin can be recovered from the culture medium by the use of a strongly basic anion exchange resin. Suitable anion exchange resins for this purpose are obtained by chloromethylating by the procedure given on pages 88 and 97 of Kunin, Ion Exchange Resins, 2nd Edition (1958), John Wiley and Sons, Inc., polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex–1, Dowex–2, Dowex–3, Amberlite IRA–400, Duolite A–102, and Permutit S–1.

As a further alternative, lomondomycin can be recovered from the culture medium or the organic extract by adsorption techniques employing such adsorbents as silicic acid, decolorizing carbon, or decolorizing resin (a suitable decolorizing resin is Permutit DR, U.S. Patent 2,702,263), alumina and Florisil (a synthetic silicate of the type described in U.S. Patent 2,393,625 and sold by the Floridin Company). The adsorbed antibiotic can be removed from the adsorbent in relatively pure form by elution with a suitable organic solvent, e.g., one of those mentioned above in which lomondomycin is soluble.

High purity lomondomycin can be obtained by subjecting an impure dry preparation of lomondomycin, obtained as described above, to crystallization procedures using diethylformamide. A crude lomondomycin preparation is dissolved in dimethylformamide and the solution polished by filtration. Water is added slowly with mixing until crystallization of the lomondomycin occurs. The lomondomycin crystals can be removed by filtration, washed with a mixture of dimethylformamide and water (5:1), followed by a lower alkanol, for example, methanol. The crystalline lomondomycin can be dried in vacuo to a constant weight. This crystalline preparation of lomondomycin can be recrystallized again by the above procedure.

Alternatively, high purity lomondomycin can be obtained by subjecting an impure dry preparation of lomondomycin to silica gel chromatography and crystallization using a solvent system composed of methanol and ethyl acetate (6:4) to develop the column.

As a further alternative, high purity lomondomycin can be obtained by recrystallizing an impure preparation of lomondomycin from acetone and methanol. An impure preparation of lomondomycin can be dissolved in boiling acetone and the solution acidified with a mineral acid, for example, hydrochloric acid. The solution then can be concentrated in vacuo. Methanol is then added to dissolve the precipitate and the solution is again concentrated in vacuo. The concentrate is then heated to about 60° C. and cooled slowly to room temperature. The crystals of lomondomycin which form are removed by filtration, washed with methanol, and dried in vacuo to a constant weight.

Salts of lomondomycin are formed employing the free acid of lomondomycin and an inorganic or organic base. The lomondomycin salts can be prepared, as for example, by dissolving lomondomycin free acid in water and dimethylformamide, adding a dilute base until the pH of the solution is about 10.0 to 11.0, and concentrating and drying the solution to provide a dried residue consisting of the lomondomycin salt. Lomondomycin salts which can be formed include the sodium, potassium and calcium salts. Other salts of lomondomycin, including those with organic bases such as primary, secondary, and tertiary monoamines, as well as with polyamines, also can be formed using the above-described or other commonly employed procedures. Other valuable salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide, and the like; phenylalkylamines such as adrenaline, ephredrine, and the like; choline, and others. Salts of lomondomycin can be used for the same biological purposes as the free acid.

Lomondomycin has a broad antibacterial spectrum as shown in Table VI. The antibacterial spectrum was determined by using a tube dilution assay procedure with the medium being BHI (Brain Heart Infusion Broth, Difco, Detroit, Mich). Assay tubes (13 mm. x 100 mm.) were prepared in the customary manner as set out in Snell, E. E., Vitamin Methods, Vol. 1, Academic Press, Inc., New York (1950), page 327. Test organisms grown for 18 hours at 37° C. were used to inoculate the test medium. The assays were read at 18 hours.

TABLE VI.—ANTIBACTERIAL ACTIVITY OF LOMONDOMYCIN TUBE DILUTION ASSAY

| Test organism: | Minimum inhibitory concentration in mcg./ml. |
|---|---|
| Staphylococcus aureus | 62 |
| Streptococcus hemolyticus | 62 |
| Escherichia coli | 62 |
| Proteus vulgaris | 125 |
| Klebsiella pneumoniae | 62 |
| Salmonella schottmuelleri | 31 |
| Pseudomonas aeruginosa | 62 |
| Bacillus subtilis | 31 |
| Diplococcus pneumoniae | 16 |

Lomondomycin has antifungal activity as shown in Table VII. The antifungal spectrum was determined by agar dilution plate assay.

TABLE VII.—ANTIFUNGAL ACTIVITY OF LOMONDOMYCIN

| Test organism: | Minimum inhibitory concentration in mcg./ml. |
|---|---|
| Nocardia asteroides | 100 |
| Blastomyces dermatitidis | 100 |
| Geotrichum sp. | 1000 |
| Phialophora verrucosa | 100 |
| Cryptococcus neoformans | 100 |
| Sporotrichum schenckii | 100 |
| Monosporium apiospermum | 1000 |
| Trichophyton rubrum | 100 |
| Candida albicans (Abbott) | 1000 |
| Trichophyton violaceum | 100 |
| Trichophyton asteroides | 100 |
| Trichophyton mentagrophytes | 100 |

The new compound of the invention, lomondomycin, is active against Bacillus subtilis and can be used to minimize or prevent odor in fish and fish crates caused by this organism. The new compound can be used as a disinfectant on various dental and medical equipment contaminated with Staphylococcus aureus; it can also be used as a disinfectant on washed and stacked foods utensils contaminated with Staphylococcus aureus. Also, since lomondomycin is active against Cryptococcus neoformans, it can be used to treat pigeon roosts to inhibit this fungus which has been found in pigeon droppings. (Journal of the American Medical Association, volume 191, No. 4, January 25, 1965, pages 269–274). The novel compound of the invention also can be used as the antifungal agent in the shoe uppers disclosed in U.S. Patent 3,130,505.

The following examples are illustrative of the process and products of the present invention, but are not to be construed as limiting. All percentages are by weight and all solvent mixture proportions are by volume unless otherwise noted.

EXAMPLE 1

A. Fermentation

A soil stock of Streptomyces lomondensis var. lomondensis, NRRL 3252, was used to inoculate a series of 500-ml. Erlenmeyer flasks, each containing 100 ml. of sterile seed medium consisting of the following ingredients:

| | |
|---|---|
| Glucose monohydrate | g./liter__ 25 |
| Pharmamedia [1] | g./liter__ 25 |
| Tap water q.s. | liter__ 1 |

[1] Pharmamedia is an industrial grade of cottonseed flour produced by Trader's Oil Mill Company, Fort Worth, Tex.

The presterilization pH is adjusted to 7.2 with aqueous sodium hydroxide.

The flasks were incubated at 28° C. for 72 hours on a Gump rotary shaker operating at 250 r.p.m.

A portion of a seed flask (5 ml.), described above, was used to inoculate each of a series of 500-ml. Erlenmeyer flasks, each containing 100 ml. of sterile fermentation medium consisting of the following ingredients:

| | G./liter |
|---|---|
| Cottonseed meal | 20 |
| Glucose monohydrate | 20 |
| Dextrin | 20 |
| $(NH_4)_2SO_4$ | 1 |
| Calcium carbonate | 4 |
| Tap water | Balance |

The presterilization pH is adjusted to 7.2 with aqueous sodium hydroxide. The fermentation flasks were incubated at 28° C. for 120 hours on a Gump rotary shaker operating at 250 r.p.m. At 48 hours, a typical fermentation broth assayed 3.5 biounits of lomondomycin; at 72 hours, it assayed 4.9 biounits of lomondomycin; at 96 hours, the fermentation broth assayed 6.0 biounits of lomondomycin; and at 120 hours, the fermentation broth assayed 4.8 biounits of lomondomycin. The assays were conducted against the microorganism Penicillium oxalicum. P. oxalicum was grown for 72 hours at 24° C. on a reciprocating shaker in the following medium: malt extract (Difco), 20 g.; peptone (Difco), 1.0 g.; dextrose, 20 g.; deionized water, 1 liter.

The agar used for assay was prepared by supplementing the above broth with 20 g. of agar per liter, and this was inoculated at the rate of 15 ml. of the broth culture, which was blended in a blender, per liter of agar medium. Assay samples were serially diluted in distilled water. The plates were incubated at 28° C. for 18 hours. A biounit is that amount of antibiotic, when dissolved in 0.08 ml. of the test solution and applied to a 12.7 mm. disc, which gives a 20 mm. zone of inhibition.

B. Recovery

The whole beer (1640 ml.) from a lomondomycin fermentation, as described above, was mixed with 5% diatomaceous earth and filtered. The cake was washed with 200 ml. of water and combined with the clarified beer (1440 ml.). An aliquot of the clear beer and wash (950 ml.) was adjusted to pH 2.0 with sulfuric acid and mixed with 950 ml. of methyl ethyl ketone. The solvent phases were separated and the aqueous phase (1300 ml.) was discarded. The methyl ethyl ketone extract was concentrated in vacuo to a volume of 20 ml. Acetone (80 ml.) was added, and the mixture was concentrated in vacuo until crystallization of the lomondomycin started. The crystalline mixture was refrigerated overnight. Crystalline lomondomycin was removed by filtration, washed with 10 ml. of water and dried in vacuo to a constant weight; yield, 198 mg. assaying 8.0 biounits/mg. against the microorganism *Escherichia coli.*

*E. coli* was grown for 18–20 hours at 37° C. on the reciprocating shaker in the following synthetic medium: $K_2HPO_4$, 7.0 g.; $KH_2PO_4$, 3.0 g.; $MgSO_4 \cdot 7H_2O$, 0.1 g.; $(NH_4)_2SO_4$, 1.0 g.; Na citrate, 1.0 g.; glucose, 2.0 g.; distilled water, 1 liter.

The synthetic agar used for assay was prepared by further supplementing this synthetic broth with 15 g. of agar per liter, and this was inoculated at the rate of 0.3 ml. of the culture per 100 ml. of agar medium. Assay samples were serially diluted in 0.1 M phosphate buffer of pH 7.85. The plates were incubated at 32° C. for 18 hours. A biounit is that amount of antibiotic when dissolved in 0.08 ml. of the test solution and applied to a 12.7 mm. disc., which gives a 20 mm. zone of inhibition.

C. *Purification*

A crude lomondomycin crystalline preparation (10 g.) was dissolved in 400 ml. of dimethylformamide at room temperature and polished by filtration. Water (80 ml.) was added slowly (for 15 minutes) while the lomondomycin was being mixed. The mixing was continued for another 15–20 minutes until crystallization (rods) started. The mixture was refrigerated for 12 hours. The lomondomycin crystals were removed by filtration and washed with a mixture of dimethylformamide and water (5:1), followed by methanol. The crystalline lomondomycin was dried in vacuo to a constant weight; yield, 7.24 g. This crystalline preparation was recrystallized again by the above procedure; yield, 5.67 of lomondomycin crystals.

EXAMPLE 2

*Potassium salt of lomondomycin*

Lomondomycin (0.5 g.), as prepared in Example 1, is suspended in water and to the mixture is added 178 mg. of potassium hydroxide dissolved in 2 ml. of water. The reaction vessel is refrigerated whereupon the potassium salt of lomondomycin crystallizes. The crystals are filtered and dried in vacuo.

We claim:
1. A composition of matter assaying at least 3.5 biounits of lomondomycin per ml., a compound which
    (a) is effective in inhibiting the growth of various Gram-negative and Gram-positive bacteria, and fungi; and in its essentially pure crystalline form;
    (b) is soluble in dimethylformamide, relatively soluble in water at a pH of about 10–12, and very soluble in acetone and methyl ethyl ketone at a pH of about 2.0;
    (c) has the following elemental analyses: C, 56.89; H, 3.35; N, 8.90; O, 30.28;
    (d) has a molecular weight of 314 as determined by mass spectrometer;
    (e) has a characteristic infrared absorption spectrum as shown in FIGURE 1 of the accompanying drawing; and
    (f) has a characteristic papergram pattern as shown in FIGURE 2 of the accompanying drawing.

2. The composition of matter of claim 1 in dry form, said composition of matter assaying at least 8.0 biounits/mg. on the *Escherichia coli* assay.

3. The compound, lomondomycin, according to claim 1, in its essentially pure form.

4. The compound, lomondomycin, according to claim 1, in its essentially pure crystalline form.

5. A compound selected from the group consisting of lomondomycin, according to claim 1, and salts thereof with alkali metals, alkaline earth metals, and amines.

6. The composition of matter of claim 1 in the form of its potassium salt.

7. A process for making the compound defined in claim 1 which comprises cultivating *Streptomyces lomondensis* var. *lomondensis* in an aqueous nutrient medium under aerobic conditions until substantial antibiotic activity is imparted to said medium by the production of lomondomycin.

8. A process according to claim 7 which comprises cultivating *Streptomyces lomondensis* var. *lomondensis* in an aqueous nutrient medium containing a source of assimilable carbohydrate and assimilable nitrogen under aerobic conditions until substantial antibiotic activity is imparted to said medium by the production of lomondomycin and isolating the lomondomycin so produced.

9. A process according to claim 8 in which the isolation comprises filtering the medium, extracting the resulting filtrate with a water-immiscible solvent for lomondomycin, and recovering lomondomycin from the solvent extract.

References Cited

UNITED STATES PATENTS 3,272,709    9/1966    Bergy et al. _____ 167—65

ALBERT T. MEYERS, *Primary Examiner.*

J. D. GOLDBERG, *Examiner.*